United States Patent
Faruque et al.

(10) Patent No.: US 9,637,179 B2
(45) Date of Patent: May 2, 2017

(54) ALUMINUM ALLOY VEHICLE STRUCTURAL COMPONENT DEFINING AN OUT-OF-PLANE APERTURE

(71) Applicant: Ford Global Technologies, LLC, Dearborn, MI (US)

(72) Inventors: Mohammed Omar Faruque, Ann Arbor, MI (US); Kevin Pline, Plymouth, MI (US); Srinivasan Sundararajan, Ann Arbor, MI (US); Duncan Whipps, Grosse Pointe Farms, MI (US); Darrin Neil Wagner, Bloomfield Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/018,238

(22) Filed: Feb. 8, 2016

(65) Prior Publication Data

US 2016/0152282 A1 Jun. 2, 2016

Related U.S. Application Data

(62) Division of application No. 14/297,762, filed on Jun. 6, 2014, now Pat. No. 9,296,432.

(51) Int. Cl.
*B60J 7/00* (2006.01)
*B62D 29/00* (2006.01)
(Continued)

(52) U.S. Cl.
CPC ........... *B62D 29/008* (2013.01); *B62D 25/00* (2013.01); *B62D 27/06* (2013.01); *B62D 33/02* (2013.01);
(Continued)

(58) Field of Classification Search
CPC ........ A47B 96/021; B65D 2543/00629; B65D 2543/00685; B65D 2543/00796; B65H 2701/31
(Continued)

(56) References Cited

U.S. PATENT DOCUMENTS 3,554,400 A * 1/1971 Bozek ................. B65D 17/165
220/273
3,556,306 A * 1/1971 Shell ..................... A47B 96/021
108/108
(Continued)

FOREIGN PATENT DOCUMENTS

JP 2004025324 A 1/2004
JP 2009115314 A 5/2009

OTHER PUBLICATIONS

Aircraft Metal Structural Repair Brochure, Chapter 4, pp. 1-114.

*Primary Examiner* — Kiran B Patel
(74) *Attorney, Agent, or Firm* — Jason Rogers; Brooks Kushman P.C.

(57) ABSTRACT

An aluminum alloy vehicle structural component defining an out-of-plane aperture with its main portion. A recessed portion is inset from the main portion having a bed sub-portion out-of-plane with the main portion that defines the aperture. The recessed portion also provides a strain hardened sub-portion, or stiffened ring of material, around the aperture. When the main portion is subjected to in-plane tension due to bending, the strain primarily concentrates along the strain hardened sub-portion (the stiffened ring) and by-passes the aperture. As a result the perimeter of the aperture undergoes less straining than if the aperture was in-plane with the main portion. The out-of-plane aperture, the bed sub-portion surrounding the aperture, and the strain hardened sub-portion surrounding the bed sub-portion may (Continued)

improve the overall structural robustness of the aluminum alloy structural component when subjected to in-plane tension.

7 Claims, 2 Drawing Sheets

(51) Int. Cl.
    *B62D 27/06*     (2006.01)
    *B62D 25/00*     (2006.01)
    *B62D 33/027*     (2006.01)
    *B62D 33/02*     (2006.01)

(52) U.S. Cl.
    CPC ..... *B62D 33/0273* (2013.01); *Y10T 29/49623* (2015.01); *Y10T 403/70* (2015.01)

(58) Field of Classification Search
    USPC .................................. 296/203.01; 72/335
    See application file for complete search history.

(56) References Cited

U.S. PATENT DOCUMENTS

| | | | | |
|---|---|---|---|---|
| 3,556,450 A | * | 1/1971 | Carlson | F16B 12/48 248/188 |
| 3,583,754 A | * | 6/1971 | Von Berckheim | B60H 3/0071 296/1.04 |
| 4,442,950 A | * | 4/1984 | Wilson | B65D 17/166 220/269 |
| 5,150,944 A | * | 9/1992 | Yoshida | B62D 29/001 296/187.02 |
| 5,251,370 A | * | 10/1993 | Muller | B23P 19/062 29/512 |
| 5,691,037 A | | 11/1997 | McCutcheon et al. | |
| 6,394,537 B1 | * | 5/2002 | DeRees | B62D 29/048 296/191 |
| 6,652,020 B2 | * | 11/2003 | Few | B62D 63/08 280/789 |
| 7,292,406 B1 | * | 11/2007 | Huang | G11B 33/08 360/97.19 |
| 8,007,029 B2 | * | 8/2011 | Sano | B62D 27/065 296/180.1 |
| 8,622,672 B2 | | 1/2014 | Babej | |
| 8,925,991 B2 | * | 1/2015 | Caliskan | B62D 25/20 296/193.07 |
| 8,979,156 B2 | * | 3/2015 | Mally | F16B 5/0657 24/297 |
| 8,985,632 B1 | * | 3/2015 | Heckman | B62D 25/04 280/801.2 |
| 9,012,006 B2 | * | 4/2015 | Fisk | B29C 65/562 156/290 |
| 9,067,621 B2 | * | 6/2015 | Ohhama | B62D 21/11 |
| 2003/0015014 A1 | * | 1/2003 | Zmyslowski | B21K 1/56 72/335 |
| 2003/0052515 A1 | * | 3/2003 | Barnard | B60R 19/52 296/193.06 |

\* cited by examiner

ALUMINUM ALLOY VEHICLE STRUCTURAL COMPONENT DEFINING AN OUT-OF-PLANE APERTURE

CROSS-REFERENCE TO RELATED APPLICATIONS

This application is a division of U.S. application Ser. No. 14/297,762 filed Jun. 6, 2014, now U.S. Pat. No. 9,296,432 issued on Mar. 29, 2016, the disclosure of which is hereby incorporated in its entirety by reference herein.

TECHNICAL FIELD

This disclosure relates to pickup trucks having aluminum-alloy vehicle structural components, and more specifically to the forming of an aperture out-of-plane from a main portion of the structural components.

BACKGROUND

Pickup trucks are motor vehicles with a front passenger area, often referred to as a cab, and an open top rear cargo area, often referred to as a box. The box usually has a substantially flat bed from which two sidewalls and a forward interconnecting headboard extend upwardly therefrom. Pickup trucks may also employ a bottom hinged door, commonly referred to as a tailgate, hinged at the rear edge of the bed and closable to provide a fourth wall for the cargo area. Cabs and boxes may be separate assemblies or part of the same unibody structure. Pickup trucks are popular largely because the box allows them to be utilized in so many different ways, including carrying a variety of types of cargo and towing various types of trailers.

Traditionally the majority of body structures on pickup trucks have been formed from steel alloys. Through years of experience, pickup truck designers have learned how to engineer steel truck body parts that withstand the variety of demanding pickup truck applications. The current regulatory and economic environments have increased the importance of making pickup trucks more fuel efficient as well as functional and durable. One way to reduce the fuel consumption of a vehicle is to reduce vehicle structure weight.

Aluminum alloys typically have a higher strength to weight ratio than steel alloys. Consequently, replacing steel with aluminum offers the potential for weight reduction. However, the elastic modulus of aluminum is generally lower than the elastic modulus of steel. As well, fabrication techniques and methods of joining parts that work well for steel parts may not work well for the same aluminum part. Due to these and other differences, simple material substitution does not necessarily produce an acceptable design.

Aluminum alloys are generally identified by a four-digit number, the first digit of which typically identifies the major alloying element(s). For example, the major alloying elements in 6xxx or 6000 series aluminium alloy are magnesium and silicon, while the major alloying element of 5xxx or 5000 series is magnesium and for 7xxx or 7000 series is zinc. When describing a series of aluminum alloys based on the major alloying element, the first number may be followed by three x's (upper or lower case) or three 0's (zeros). Additional numbers represented by the letter 'x' or number '0' in the series designation define the exact aluminum alloy. For example, a 6061 aluminum alloy has a composition of 0.8-1.2% Magnesium, 0.4-0.8% Silicon, 0.15-0.4% Copper, 0.04-0.35% Chromium, 0-0.7% Iron, 0-0.25% Zinc, 0-0.15% Manganese, and 0-0.15% Titanium. Different alloys provide different trade-offs of strength, hardness, workability, and other properties.

In addition, five basic temper designations may be used for aluminum alloys which are: F—as fabricated, O—annealed, H—strain hardened, T—thermally treated, and W—as quenched (between solution heat treatment and artificial or natural aging). The temper designation may be followed by a single or double digit number for further delineation. For example, aluminum with a T6 temper designation has been solution heat treated and artificially aged, but not cold worked after the solution heat treatment (or such that cold working would not be recognizable in the material properties).

SUMMARY

One aspect of this disclosure is directed to an automotive component defining an out-of-plane aperture. The component is an aluminum alloy structural component having a main portion surrounding a recessed portion. The recessed portion has a strain hardened sub-portion connecting a bed sub-portion to the main portion. The bed sub-portion is out-of-plane with the main portion and defines an aperture. The structural component may be a 6000 series aluminum alloy. The structural component may be 6111 aluminum alloy.

In this aspect, the bed sub-portion may be substantially parallel with the main portion. The bed sub-portion may also have a width of at least 6 millimeters extending substantially perpendicularly from any point on a perimeter of the aperture. The main portion may have a first thickness and the bed sub-portion may have a second thickness substantially equal to the first thickness. The first and second thicknesses may be at least 2 millimeters.

The main portion may have a substantially flat first surface. The bed sub-portion may have a substantially flat second surface. The second surface may be substantially parallel with the first surface. A depth between the first surface and the second surface may be at least 2.5 times the first thickness. The depth may be at least 5 millimeters.

A first interface may extend between the main portion and the strain hardened sub-portion having a first radius. A second interface may extend between the strain hardened sub-portion and the bed sub-portion having a second radius. The first and second radii may curve in opposite directions. The first and second radii may be at least 3 times the first thickness. The first and second radii may be at least 6 millimeters.

The aperture may be substantially circular, however other shapes may be used and multiple apertures may be clustered together. The aperture may have a diameter of at least 16 millimeters. The aperture may be an access hole used during assembly of the component. The recessed portion may extend inwardly into the structural component from an outer surface or may extend outwardly from the structural component from an inner surface.

Another aspect of this disclosure is directed to a pickup truck with a 6000 series aluminum alloy structural component. The 6000 series aluminum alloy structural component has a main portion surrounding a bed sub-portion out-of-plane with the main portion. The 6000 series aluminum alloy structural component also has a strain hardened sub-portion disposed between the main portion and the bed sub-portion. The bed sub-portion defines an aperture, thus providing for the aperture being out-of-plane with the main portion. The structural component may be part of a roof-header assembly.

The bed sub-portion extends substantially parallel with the main portion from a perimeter of its defined aperture by a minimum of 6 millimeters. The structural component may have a substantially constant thickness. The thickness may be at least 2 millimeters. The bed sub-portion may have a depth from the main portion of at least 2.5 times the thickness. The depth may be 5 millimeters.

A first interface between the main portion and the strain hardened sub-portion may have a first radius of at least 3 times the thickness. The first radius may be at least 6 millimeters. A second interface between the strain hardened sub-portion and the bed sub-portion may have a second radius of at least 3 times the thickness. The second radius may have a dimension substantially the same as the first radius. The second radius may be at least 6 millimeters.

A further aspect of this disclosure is directed to a method of producing an aluminum alloy vehicle structural component defining an out-of-plane aperture. A first step in this method includes selecting an aluminum alloy blank having a thickness. A second step in this method includes forming the blank such that a bed sub-portion is formed substantially parallel to and out-of-plane from a main portion by a distance of at least 2.5 times the thickness and defines and surrounds an aperture by at least 6 millimeters.

In this aspect, the step of forming the blank may also include drawing the bed sub-portion from the main portion and strain hardening a double curvature strain hardened sub-portion between the bed sub-portion and the main portion. The double curvature strain hardened sub-portion may have a first radius and a second radius each at least 3 times the thickness. Also in this aspect, the step of forming the blank may include punching the aperture substantially simultaneously with the drawing of the bed sub-portion.

The above aspects of this disclosure and other aspects will be explained in greater detail below with reference to the attached drawings.

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

Figure 1:
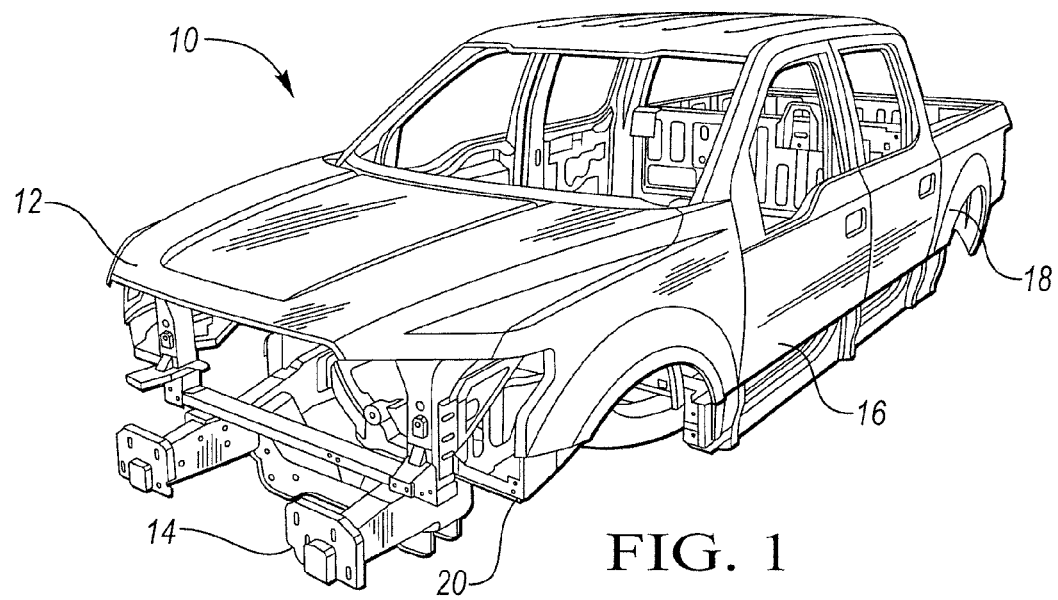
FIG. 1 is a perspective view of a pickup truck cab and box on a frame.

FIG. 1 shows a not-yet-complete pickup truck 10 having a body 12 mounted on a frame 14. The body 12 has a cab 16 and a box 18. The body structure 12 may comprise a number of structural automotive components 20. The structural components 20 may be aluminum alloys. The structural components may be 5xxx series and 6xxx series aluminum alloys.

Figure 2:
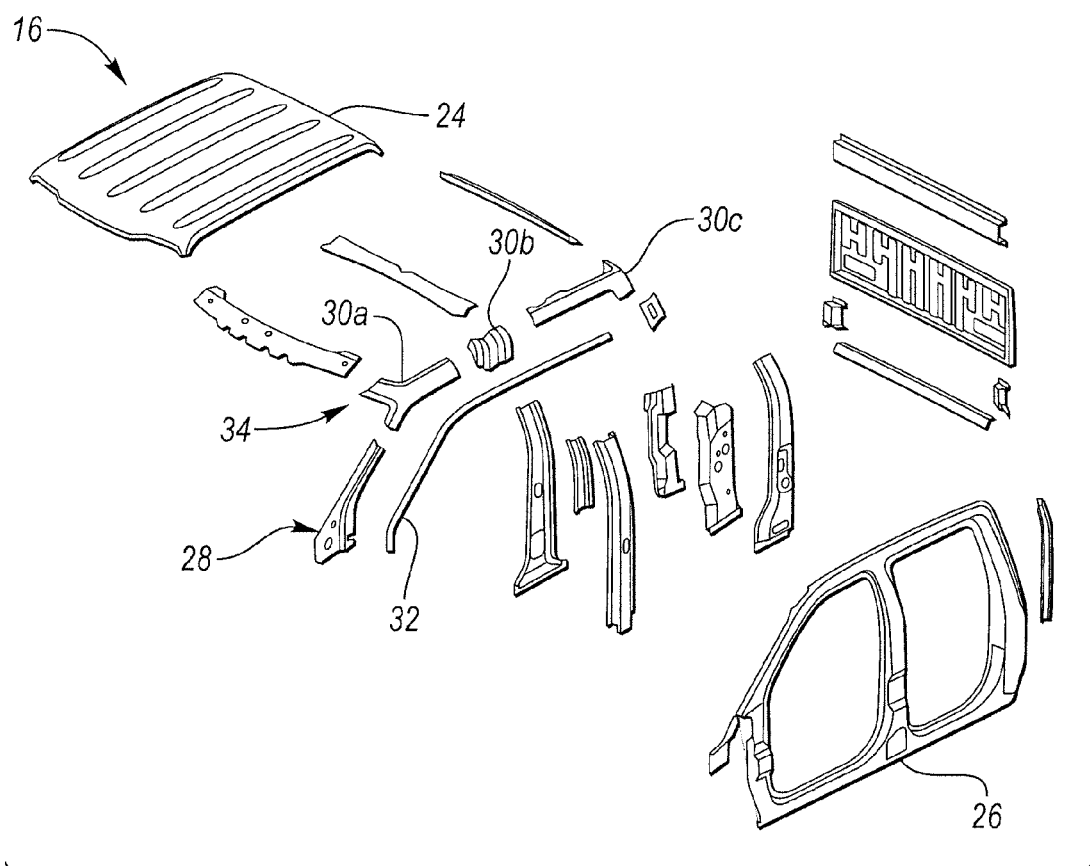
FIG. 2 is a partial exploded view of a pickup truck cab.

FIG. 2 shows a partial exploded view of the cab 16 illustrating an example of a number of structural components 20. A roof panel 24, a side door opening structure 26, and a number of reinforcement members 28, 30a, 30b, 30c, 32 are labeled. The reinforcement members 30a, 30b, 30c may be assembled to provide a roof-header assembly 34. The roof-header assembly 34 connects a portion of the roof panel 24 to the side structure 26 and provides structural support for the cab 16 of the pickup truck 10. Other structural components 20 shown may also be included to provide the roof-header assembly 34.

All of the components shown in FIG. 2, whether labeled or not, may be considered structural components 20. As well other components not shown in FIG. 2, such as those that make up the box 18 (see FIG. 1), may also be considered structural components 20. Structural components 20 include exterior body panels, interior body panels, reinforcement members, and connecting members that allow for all of the previous mentioned components to be assembled together. All of the components in FIG. 2, labeled or not labeled, may be made from 6xxx series aluminum alloy. The roof-header assembly 34 may be a 6111 aluminum alloy.

Vehicle frame 14 and body assemblies 12 (see FIG. 1) may be assembled by joining individual formed components (i.e. 28, 30a, 30b, 30c, 32). Joining methods may include Resistance Spot Welding (RSW), Self-Piercing Rivets (SPR) and the use of other fasteners such as bolts. During the process of assembly, access apertures may be required in some of the components to permit manufacturing tools access to join the components. For example, RSW may require access apertures for weld gun access, SPR may requires access apertures for SPR guns, and for bolts and/or nuts, a nut runner tool may require an aperture for accessing a joint and coupling several parts together. In addition, apertures may also be used for E-coat draining and weight reduction.

Figure 3:
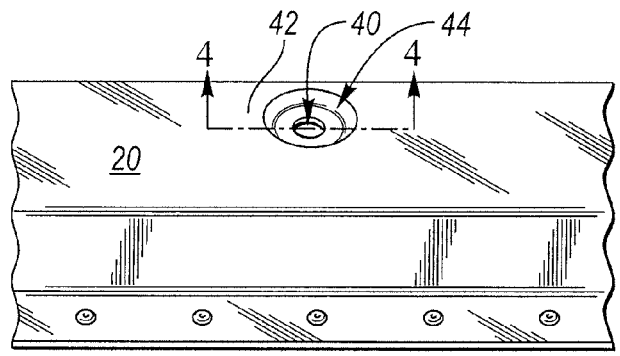
FIG. 3 is a partial perspective view of an aluminum alloy structural component defining an out-of-plane aperture.
Figure 4:
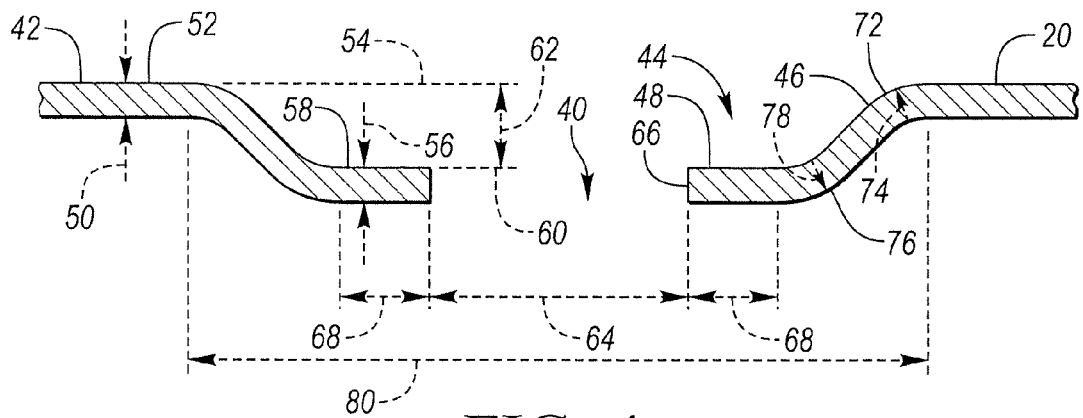
FIG. 4 is a cross-sectional view taken along line 4-4 in FIG. 3.

FIGS. 3 and 4 show perspective and cross-sectional views, respectively, of portion of a structural component 20 defining an aperture 40. The structural component 20 has a main portion 42 surrounding a recessed portion 44. The recessed portion 44 has a strain hardened sub-portion 46 and a bed sub-portion 48. The strain hardened sub-portion 46 is disposed between the main portion 42 and bed sub-portion 48. The strain hardened sub-portion 46 connects the bed sub-portion 48 to the main portion 42. A portion of the strain hardened sub-portion 46 may have a hardness higher than the main portion 42. The recessed portion 44 may extend inwardly into the structural component 20, as shown in FIG. 3, or may be inverted to extend outwardly from the structural component 20.

The main portion 42 has a first thickness 50 and a first surface 52. The first surface 52 is substantially flat and may be used to define a first plane 54. The bed sub-portion 48 has a second thickness 56 and a second surface 58. The second surface 58 is substantially flat and may be used to define a second plane 60. The second thickness 56 may be substantially equal to the first thickness 50. The structural component 20 may have a substantially constant thickness 50, 56 proximate the aperture 40. For example, the thickness 50, 56 may 2 millimeters. Substantially, as used in this patent application, does not mean exactly, thus some tolerance may be given and a person of skill in the art may determine a fair amount of tolerance for each feature that the term substantially modifies. For example, the second thickness 56 may be thinner than the first thickness 50 due to a drawing of the material to form the recessed portion 44 and still be considered substantially equal to each other.

The second surface 58 may be substantially parallel with the first surface 52, and with substantial flatness's and being substantially equal thicknesses 50, 56, it may be said that the bed sub-portion 48 is substantially parallel with the main portion 42. A depth 62 may be defined between the first surface 52 and the second surface 58. The depth 62 may be at least 2.5 times the first thickness 50. For example, if the structural component 20 has a thickness 50 of 2 millimeters, the depth would be at least 5 millimeters. The depth 62 may also be constrained to be within 4 times the thickness 50 for manufacturability considerations. The depth 62 of the first surface 52 of the main portion 42 (used to define the first plane 54) from the second surface 58 of the bed sub-portion 48 (used to define the second plane 60) provides that the bed sub-portion 48 is out-of-plane with the main portion 42.

The bed sub-portion 48 defines the aperture 40. The aperture 40 may be substantially circular, however other shapes may be used and multiple apertures may be clustered together. The aperture 40 may have a diameter 64 of at least 4 millimeters. The bed sub-portion 48 also defines a perimeter 66 of the aperture 40. The bed sub-portion 48 has a width 68 extending substantially perpendicularly from the perimeter 66. The width 68 may be at least 6 millimeters such that the bed sub-portion 48 extends a minimum of 6 millimeters from every point along the perimeter 66 of the aperture 40. The aperture 40 may be an access hole used during assembly of the component. An access hole may have a diameter 64 of at least 16 millimeters.

A first interface 72 may be defined that extends between the main portion 42 and the strain hardened sub-portion 46. The first interface 72 may be considered to be part of the strain hardened sub-portion 46 and connected to the main portion 42 as opposed to being disposed between the two. The first interface 72 has a first radius 74. The first radius 74 may be at least 3 times the first thickness 50. For example, if the structural component 20 has a thickness 50 of 2 millimeters, the first radius 74 would be at least 6 millimeters.

A second interface 76 may be defined extends between the strain hardened sub-portion 46 and the bed sub-portion 48. The second interface 76 may be considered to be part of the strain hardened sub-portion 46 and connected to the bed sub-portion 48 as opposed to being disposed between the two. The second interface 76 has a second radius 78. The second radius 78 may be at least 3 times the first thickness 50. For example, if the structural component 20 has a thickness 50 of 2 millimeters, the first radius 74 would be at least 6 millimeters.

The recessed portion 44 may have an overall footprint 80. The footprint 80 surrounding a circular aperture 40 may have a depth-to-footprint ratio. The depth-to-footprint ratio may be determined by dividing the footprint 80 by the depth 62. A depth-to-footprint ratio between 0.05 and 0.2 may be desirable. For example, a structural member 20 having a recessed portion 44 defining a circular aperture 40 may have a depth 62 of 5 millimeters and a footprint 80 of 33 millimeters. The recessed portion 44 in this example may have a depth-to-footprint ratio of 0.15.

The recessed portion 44 may provide a stiffened ring of material around the aperture 40 at least partially due to the alternating double curvature of the first and second interfaces 72, 76 and the manufacturing of the structural component 20 to achieve the geometric shape. Additional strain hardening processes may be conducted to the strain-hardened sub-portion 46 outside of the manufacturing process used to define the shape. In addition, the recessed portion 44 defines the aperture 40 out-of-plane from the main portion 42. Thus, if the main portion 42 is subjected to in-plane tension, such as due to a bending, the strain in the structural component 20 primarily concentrates along the strain hardened sub-portion 46 (the stiffened ring) and by-passes the aperture 40. As a result the perimeter 66 of the aperture 40 undergoes less straining than if the aperture 40 was in-plane with the main portion 42.

The aperture 40 being defined out-of-plane from the main portion 42, the bed sub-portion 48 surrounding the aperture 40, and the strain hardened sub-portion 46 surrounding the bed sub-portion 48 may improve the overall structural robustness of the aluminum alloy structural component 20.

Figure 5:
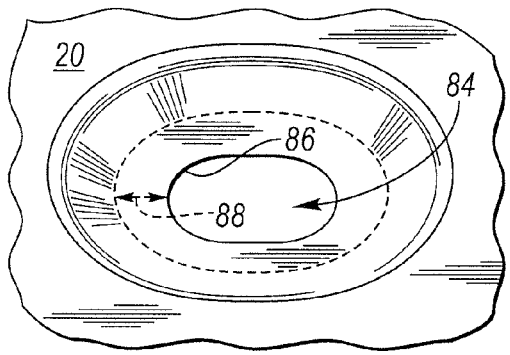
FIG. 5 is a partial top view of an aluminum alloy structural component defining an out-of-plane slotted aperture.

FIG. 5 is a partial top view of an aluminum alloy structural component 20 defining an out-of-plane slotted aperture 84. The slotted aperture 84 is a representation that an aperture may have any geometric shape. The slotted aperture has a perimeter 86. As before, a width 88 extends substantially perpendicularly from the perimeter 86. The width 88 may extend a minimum of 6 millimeters from every point along the perimeter 86 of the aperture 84.

Figure 6:
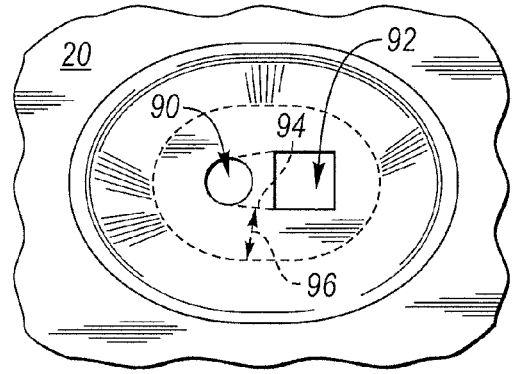
FIG. 6 is a top view of an aluminum alloy structural component defining an out-of-plane cluster of apertures.

FIG. 6 is a partial top view of an aluminum alloy structural component 20 defining an out-of-plane cluster of apertures 90, 92. A circular first aperture 90 and a square second aperture 92 are shown as examples of clustered apertures having varying geometries. Any number of apertures may be included in a cluster. Different from the embodiments listed above is that the perimeter 94 is not just the edge of the geometric shape, but the overall boundary of all of the clustered apertures, sharing edge boundaries of one geometric shape and traveling from one aperture 90 to another aperture 92, as shown in the figure. A width 96, like before, then extends substantially perpendicularly from the perimeter 94. The width 96 may extend a minimum of 6 millimeters from every point along the perimeter 94 of the apertures 90, 94. Note that the distance between apertures 90, 92 may be greater or less than 6 millimeters.

A method of manufacturing may be conducted to produce the structural component 20 as described above. The structural component 20, in this case, may be an aluminum alloy vehicle structural component defining an out-of-plane aperture. A first step in this method may include selecting an aluminum alloy blank having a known thickness. The blank may be cut from a roll of substantially constant thickness aluminum alloy. A second step in the method may include forming the blank such that a bed sub-portion is formed substantially parallel to and out-of-plane from a main portion by a distance of at least 2.5 times the thickness and defines and surrounds an aperture by at least 6 millimeters.

The forming step may include drawing the bed sub-portion from the main portion. Drawing is a stamping operation. The forming step may also include strain hardening a double curvature strain hardened sub-portion between the bed sub-portion and the main portion. The strain hardening may be performed by the drawing operation. The method may also include, or alternatively include, a separate strain hardening operation performed on the strain hardened sub-portion. The double curvature strain hardened sub-portion may have a first radius and a second radius each at least 3 times the thickness.

The step of forming the blank may also include punching the aperture. The aperture may be punched at substantially the same time as the drawing the bed sub-portion. Alternatively, the aperture may be cut out after the bed sub-portion is formed. As well, the aperture may be formed first and the bed-sub portion formed around the aperture.

While exemplary embodiments are described above, it is not intended that these embodiments describe all possible forms of the disclosed apparatus and method. Rather, the words used in the specification are words of description rather than limitation, and it is understood that various changes may be made without departing from the spirit and scope of the disclosure as claimed. The features of various implementing embodiments may be combined to form further embodiments of the disclosed concepts.

What is claimed is:

1. A pickup truck comprising:
an aluminum alloy structural component having a side including a main portion defining a bed sub-portion that is encircled by the main portion and is out-of-plane with the main portion, the bed sub-portion being substantially parallel to the main portion and connected to the main portion by a strain hardened sub-portion, wherein the bed sub-portion defines an aperture, and wherein the main portion has a substantially flat first surface, the bed sub-portion has a substantially flat second surface substantially parallel with the first surface, and a depth between the first surface to the second surface is at least 2.5 times a thickness of the main portion.

2. The pickup truck of claim 1 wherein the bed sub-portion has a thickness that is substantially equal to a thickness of the main portion.

3. A pickup truck comprising:
an aluminum alloy structural component having a side including a main portion defining a bed sub-portion that is encircled by the main portion and is out-of-plane with the main portion, the bed sub-portion being substantially parallel to the main portion and connected to the main portion by a strain hardened sub-portion, wherein the bed sub-portion defines an aperture, and wherein a first interface extends between the main portion and the strain hardened sub-portion having a first radius and a second interface extends between the strain hardened sub-portion and the bed sub-portion having a second radius, and wherein the first and second radii are at least 3 times a thickness of the main portion.

4. The pickup truck of claim 1 wherein the aperture is substantially circular.

5. The pickup truck of claim 4 wherein the aperture has a diameter of at least 16 millimeters.

6. The pickup truck of claim 1 wherein the aperture is an access hole used during assembly of the component.

7. The pickup truck of claim 1 wherein the aluminum alloy structural component is a 6000 series aluminum alloy.

* * * * *